United States Patent Office

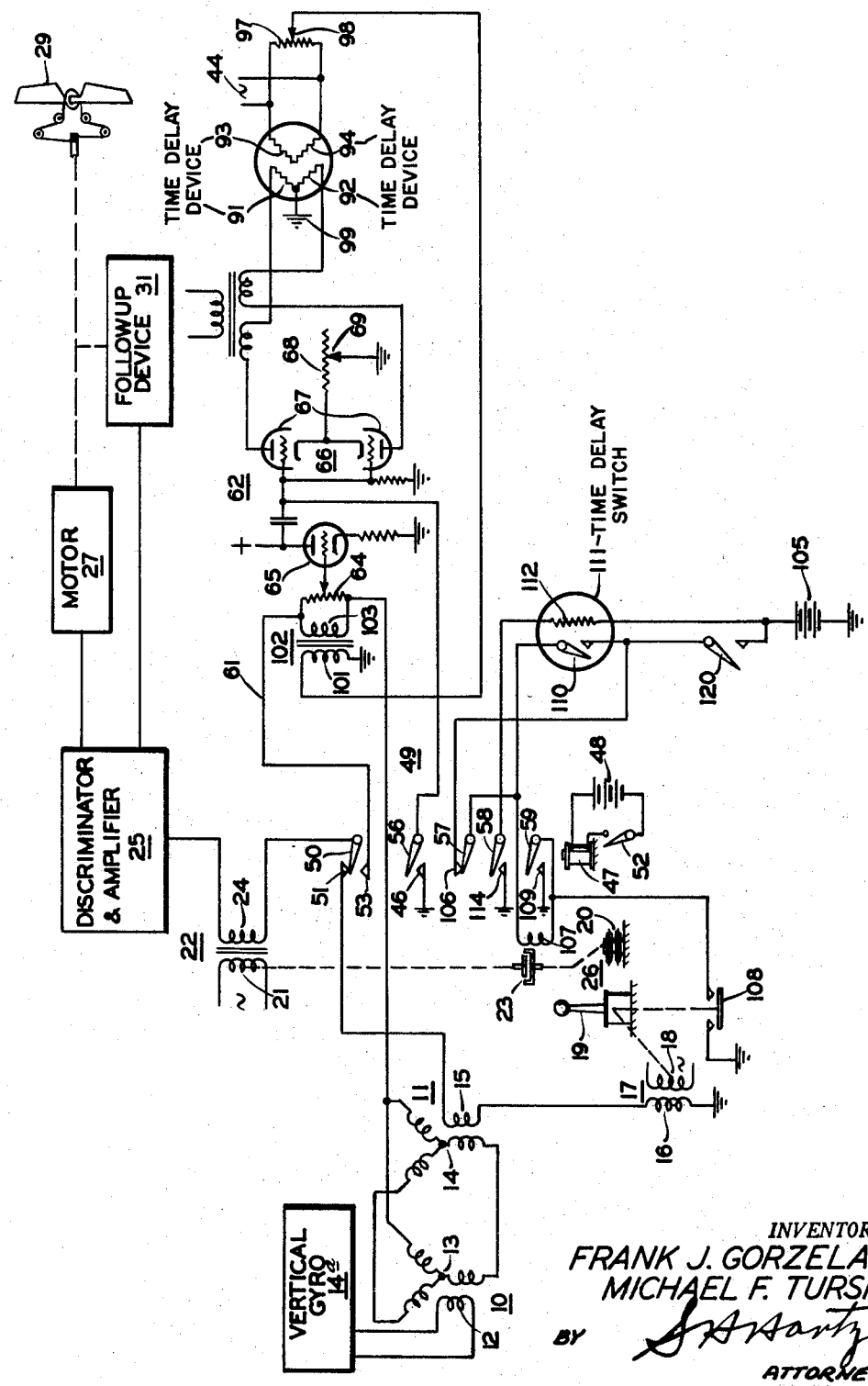

2,889,509
Patented June 2, 1959

2,889,509

SYSTEM FOR RETURNING A CRAFT TO LEVEL FLIGHT

Frank J. Gorzelany, Passaic, and Michael F. Tursky, Dover, N.J., assignors to Bendix Aviation Corporation, Teterboro, N.J., a corporation of Delaware Application October 28, 1957, Serial No. 692,665

10 Claims. (Cl. 318—489)

The invention relates generally to automatic pilot systems for aircraft, and more particularly to automatic pilot systems for returning the craft to level flight.

A pilot flying a craft in fog or darkness may lose ground reference. Some automatic pilots are equipped with a return to level flight switch so that by operating the switch the craft automatically returns to straight and level flight. However, the aircraft may be returned to level attitude so suddenly that stresses are imposed on the craft exceeding the design limits, since the magnitude of the control signal for returning the craft to level flight depends upon the extent of displacement of the craft from straight and level flight attitude.

An object of the present invention is, therefore, to provide novel apparatus for returning an aircraft to level flight at a rate which will not exceed the design limits of the craft.

Another object is to render the altitude control inoperative while the craft is returning to level flight attitude and then render the altitude control operative after the craft has attained a level flight attitude so that the craft is maintained automatically in level flight at the altitude at which it levels off.

The invention contemplates an automatic pilot having means for providing signals corresponding to the attitude of the craft and means for operating a control surface of the craft in response thereto, means for returning the craft to level flight comprising a circuit receiving the attitude signal and substantially reducing the effectiveness of the signal, means for connecting the circuit to the control surface operating means and for rendering the control surface operating means responsive to the reduced attitude signal, and means for gradually rendering the circuit ineffective for reducing the effectiveness of the attitude signal so that the craft gradually assumes a level flight attitude. The effectiveness of the signal may be reduced by applying the signal to a time delay circuit for providing a signal in opposition to the attitude signal, and the control surface operating means may be made responsive to the algebraic sum of the attitude signal and opposition signal, and means may be provided for gradually decreasing the opposition signal so that the craft gradually assumes a level flight attitude.

The foregoing and other objects and advantages of the invention will appear more fully hereinafter from a consideration of the detailed description which follows, taken together with the accompanying drawing wherein one embodiment of the invention is illustrated. It is to be expressly understood, however, that the drawing is for the purpose of illustration and description, and is not to be construed as defining the limits of the invention.

The single sheet of drawing illustrates diagrammatically the novel return to level flight and altitude engaging arrangement of the present invention incorporated in a pitch control channel of an automatic pilot system.

In the drawing, the novel arrangement of the present invention is shown as comprising an inductive transmitter 10 and receiver 11 having their stator windings 13 and 14 respectively connected back to back to develop attitude signals for the aircraft. Rotor winding 12 of inductive transmitter 10 is operated by a conventional vertical gyro 14a and rotor winding 15 of inductive receiver 11 is connected to the secondary winding 16 of a variable transformer 17 having its primary winding 18 operated by a conventional manual controller 19.

Since the altitude of the aircraft may change due to up-drafts or down-drafts without a corresponding change in pitch attitude, a conventional altitude control 26 is provided to maintain the craft at constant altitude. The altitude control may be of the type described in U.S. Patent No. 2,657,350, issued October 27, 1953 to Henry S. Rossire and assigned to the same assignee as the present application. The embodiment shown herein comprises an aneroid 20 responsive to static pressure and operating the rotor 21 of a variable transformer 22 when a magnetic clutch 23 is engaged. The stator winding 24 of variable transformer 22 is connected to rotor winding 15 of receiver 11 when contact 51 and armature 50 of a relay 49 are closed.

The attitude signal, or the attitude signal as modified by the position of the normal controller, is added algebraically to the altitude signal and applied to a discriminator and amplifier 25 to detect the phase of the signal and amplify it sufficiently to operate a conventional induction motor 27 for displacing the elevator surface 29 of the craft.

A follow-up inductive device 31 also is actuated by motor 27 to develop a follow-up signal which is applied to discriminator and amplifier 25 in opposition to the sum of the other signals applied thereto. During the operation just described armature 50 engages contact 51 so that servomotor 27 is controlled by a summation of the attitude gyro signal, the manual controller signal, the altitude signal and follow-up signal. Any other signals for normal auto-pilot operations may also be used.

If the craft were returned to level flight by disconnecting the manual controller signal and the altitude signal so that motor 27 is controlled only by the gyro attitude signal and follow-up signal, the amplitude of the gyro attitude signal will be relatively large if the craft is in a steep pitch attitude and this will cause the craft to return rapidly to level flight and possibly impose forces on the craft exceeding the design limits. Novel means is provided to control the rate at which the craft is returned to level attitude by applying the attitude signal from transmitter 10 to an integrator and time delay circuit 62 to provide a signal in opposition to the gyro attitude signal and applying these signals to discriminator and implifiers 25 for controlling operation of motor 27. The opposition signal gradually decreases so that the craft gradually assumes a level flight attitude.

The craft may be returned automatically to level flight attitude by moving a return-to-level flight switch 52 to closed circuit position to energize solenoid 47 of relay 49 by battery 48. Armature 50 of relay 49 thereupon disengages contact 51 and engages contact 53. This disconnects the attitude gyro signal and the manual controller signal from discriminator and amplifier 25 and renders the altitude controller ineffective.

The attitude gyro signal from transmitter 10 is applied to integrator and time delay circuit 62 by means of a transformer 102 having one winding 103 connected across a potentiometer 64 for adjusting the strength of the signal. Potentiometer 64 is connected to a preamplifier 65 for amplifying the signal, and the amplified signal is impressed on a discriminator 66 comprising a dual triode 67. The output of preamplifier 65 is connected through armature 56 and contact 46 to ground when relay 49 is operated. Connected in the plate circuits of these tubes are two grounded resistors 91 and 92 of a time delay device which are heated by the plate current flowing therethrough. In heat exchange relationship in a closed envelope with the resistors 91 and 92 are two other resistors 93 and 94 forming the two arms of a bridge circuit whose other arms comprise the two sections of a potentiometer 97 provided with a wiper 98.

The bridge circuit, comprising resistors 93, 94 and potentiometer 97, is connected across an alternating potential source 44. Wiper 98 is connected to winding 101 of coupling transformer 102 whose other winding 103 is connected to transmitter 10. When the craft assumes a pitch attitude, inductive device 10 develops a signal which is applied to winding 103 of transformer 102 and to potentiometer 64. The attitude signal is impressed upon preamplifier 65 whose output is applied to discriminator 66. Depending upon the phase of the signal, one resistor 91 or 92 is heated more than the other, thereby causing a change in the resistance of resistor 93 or 94. A change in either of these resistors unbalances the associated bridge circuit to provide a signal which is fed back to winding 101 of transformer 102 in opposition to the pitch attitude signal.

When level flight switch 52 is moved to closed circuit position, solenoid 47 is energized causing armatures 50, 56, 58 and 59 to engage contacts 53, 46, 114, and 109 respectively and armature 57 to disengage contact 106. When armature 56 engages contact 46 the output of preamplifier 65 is grounded and the heated resistor 91 or 92 cools, and as it cools, the bridge including resistors 93 and 94 gradually balances, and the opposition signal on primary winding 101 at coupling transformer 102 decreases. The opposition signal and the attitude signal are applied to discriminator and amplifier 25 through armature 50 and contact 53. However, since these signals cause the elevator to return the craft to level flight, the attitude signal also decreases and the return to level flight is gradual so that design stress limits of the craft are not exceeded.

Should the altitude control be engaged at this time, a condition may exist in which the error signal from the altitude control cancels the error signal from the vertical gyro so that the craft is neither flying at a level attitude or at the desired altitude. Accordingly, when the level flight switch is engaged the altitude control clutch 23 is disengaged temporarily and the altitude control is rendered ineffective.

Altitude control clutch 23 is engaged by closing a manual switch 120 and energizing a solenoid 107 by a battery 105 through relay contact 106, armature 57 and control switch 108 of manual controller 19. When solenoid 47 is energized by operating return to level flight switch 52, armature 57 disengages contact 106 and clutch solenoid 107 is deenergized to disengage clutch 23 and render altitude control 26 ineffective. However, armature 59 engages contact 109 and connects clutch solenoid 107 to battery 105 when contacts 110 of time delay switch 111 are closed. Heater 112 of time delay switch 111 is connected to battery 105 through armature 58 and contact 114 and when heater 112 attains the required temperature, contacts 110 close and operate clutch 23 to render the altitude control effective. This time delay is such that the craft attains level flight after switch 52 is operated and before the altitude control clutch 23 engages. Thereafter, the operation of the vertical gyro and the altitude control maintain the craft in level attitude at the altitude at which the time delay closes.

The foregoing has presented a novel return to level flight arrangement for the automatic pilot system of an aircraft which controls the amplitude of the attitude signal applied to the automatic control so that the craft attains level attitude without stresses beyond its design limits. The altitude control is rendered ineffective during the return to level flight to allow the craft to assume a level flight attitude and the altitude control is then engaged automatically to maintain the craft at the altitude at which the altitude control is rendered effective.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

While the invention has been described in connection with the pitch channel of an automatic pilot, it should be understood that the invention also is applicable to the roll channel and in such an arrangement a roll gyro signal would be used in place of a pitch gyro signal and a direction signal would be used in place of an altitude signal.

What is claimed is:

1. In an automatic pilot having means for providing signals corresponding to the attitude of the craft and means for operating the control surface of the craft in response thereto, means for returning the craft to level flight comprising a circuit receiving the attitude signal and substantially reducing the effectiveness of the signal, means for connecting the circuit to the control surface operating means and for rendering the control surface operating means responsive to the reduced attitude signal, and means for gradually rendering the circuit ineffective for reducing the effectiveness of the attitude signal so that the craft gradually assumes a level flight attitude.

2. In an automatic pilot having means for providing signals corresponding to the attitude of the craft and means for operating the control surface of the craft in response thereto, means for returning the craft to level flight comprising a time delay circuit receiving the attitude signal and providing a signal in opposition thereto, means for connecting the time delay circuit to the control surface operating means, and means for gradually decreasing the opposition signal so that the craft gradually assumes a level flight attitude.

3. An automatic pilot system of the kind described in claim 2 which includes an altitude controller, means for rendering the altitude controller temporarily ineffective while the craft returns to level flight attitude, and means for rendering the altitude controller effective after the craft returns to level flight attitude to maintain the craft at constant altitude.

4. In an automatic pilot having means for providing signals corresponding to the attitude of the craft and means for operating the control surface of the craft in response thereto, means for returning a craft to level flight comprising a time delay circuit receiving the attitude signal and providing a signal in opposition thereto, means for rendering the control surface operating means responsive to the algebraic sum of the attitude signal and opposition signal, and means for gradually decreasing the opposition signal so that the craft gradually assumes a level flight attitude.

5. In an automatic pilot system for controlling a craft, means for providing attitude signals corresponding to the attitude of the craft, a manual controller for altering the attitude of the craft and providing signals corresponding thereto, means responsive to the signals for operating a control surface of the craft in accordance therewith, and means for returning the craft to level flight comprising a time delay circuit receiving the attitude signal and providing a signal in oppositon thereto, and means for connecting the time delay circuit to the control surface operating means and for gradually decreasing the opposition signal so that the aircraft gradually assumes a level flight attitude.

6. An automatic pilot system of the kind described in claim 5 which includes an altitude controller, means for rendering the altitude controller temporarily ineffective while the craft returns to level flight attitude, and time delay means for rendering the altitude controller effective after the craft returns to level flight attitude to maintain the craft at constant altitude.

7. In an automatic pilot having means for providing signals corresponding to the attitude of the craft and means for operating the control surface of the craft in response thereto, means for returning the craft to level flight comprising a time delay circuit receiving the attitude signal and including thermal means for providing a signal in opposition thereto, switching means for connecting the time delay circuit to the control surface operating means for controlling the control surface operating means by a summation of the attitude signal and opposition signal, and means for gradually decreasing the opposition signal by operating the thermal means so that the craft gradually assumes a level flight attitude.

8. In an automatic pilot having means for providing signals corresponding to the attitude of the craft and means for operating the control surface of the craft in response thereto, means for returning the craft to level flight comprising a time delay circuit including thermal means connected in a bridge and adapted to unbalance the bridge in accordance with the attitude signal and provide a signal in opposition to the attitude signal, switching means for connecting the time delay circuit to the control surface operating means for controlling the control surface operating means by a summation of the attitude signal and opposition signal, and means for gradually decreasing the opposition signal by rendering the thermal means ineffective to the attitude signal so that the bridge gradually balances and the opposition signal gradually decreases so that the craft gradually assumes a level flight attitude.

9. In an automatic pilot system for controlling a craft, means for providing attitude signals corresponding to the attitude of the craft, a manual controller for altering the attitude of the craft and providing signals corresponding thereto, follow-up signal means for providing signals corresponding to the position of a control surface of the craft, means responsive to the signals for operating the control surface in accordance therewith, and means for returning the craft to level flight comprising a time delay circuit including thermal means connected in a bridge and adapted to unbalance the bridge in accordance with the attitude signal and provide a signal in opposition to the attitude signal, switching means for connecting the time delay circuit to the control surface operating means for controlling the control surface operating means by a summation of the attitude signal, opposition signal and follow-up signal, and means for gradually decreasing the opposition signal by rendering the thermal means ineffective to the attitude signal so that the bridge gradually balances and the opposition signal gradually decreases so that the craft gradually assumes a level flight attitude.

10. In an automatic pilot for controlling a craft, means for providing attitude signals corresponding to the attitude of the craft, a manual controller for altering the attitude of the craft and providing signals corresponding thereto, an altitude controller for providing signals corresponding to the altitude of the craft, follow-up signal means for providing signals corresponding to the position of a control surface of the craft, means responsive to the signals for operating the control surface in accordance therewith, means for returning the craft to level flight comprising a time delay circuit incuding thermal means connected in a bridge and adapted to unbalance the bridge in accordance with the attitude signal and provide a signal in opposition to the attitude signal, switching means for disconnecting the manual controller and for temporarily rendering ineffective the altitude controller from control of the control surface operating means and for connecting the time delay circuit to the control surface operating means for controlling the control surface operating means by a summation of the attitude signal, opposition signal and follow-up signal, and means for gradually decreasing the opposition signal by rendering the thermal means ineffective to the attitude signal so that the bridge gradually balances and the opposition signal gradually decreases so that the craft gradually assumes a level flight attitude, and time delay means for rendering the altitude controller effective after the craft returns to level flight attitude to maintain the craft at constant altitude.

No references cited.